United States Patent [19]

Richards

[11] 3,848,468
[45] Nov. 19, 1974

[54] HAND GRIP TESTING DEVICE FOR BODY WEIGHING SCALES

[76] Inventor: Oran D. Richards, 1116½ Middlebury St., Elkhart, Ind. 46514

[22] Filed: Feb. 1, 1973

[21] Appl. No.: 328,609

[52] U.S. Cl. ................................................. 73/380
[51] Int. Cl. ............................................. G01l 5/02
[58] Field of Search ......... 73/379, 380, 381; 272/68

[56] References Cited
UNITED STATES PATENTS

| | | | |
|---|---|---|---|
| 1,623,869 | 4/1927 | Giraldi | 73/380 |
| 1,718,413 | 6/1929 | Edwards | 73/381 |
| 2,784,592 | 3/1957 | Newman | 73/379 |
| 3,045,793 | 7/1962 | Yeinen | 272/68 X |

*Primary Examiner*—Herbert Goldstein
*Attorney, Agent, or Firm*—Hobbs & Green

[57] ABSTRACT

The hand grip testing device for use with body weighing scales having a platform, a base, and a dial, in which a generally U-shaped frame has a first horizontal member for slipping beneath the body of the scales and a second horizontal member for extending above the platform of the scales in spaced relation thereto. A plunger having a handle at the upper end extends downwardly through said second horizontal member and engages the upper surface of the platform, and hand receiving elements or pads are disposed on the underside of the horizontal member for use by the fingers when the plunger is pressed downwardly in the grip testing action.

5 Claims, 3 Drawing Figures

PATENTED NOV 19 1974 3,848,468

HAND GRIP TESTING DEVICE FOR BODY WEIGHING SCALES

In recent years physical exercise and body development have been rather extensively practiced as a means for maintaining good health and assisting physical growth, and many of these activities are or can be practiced in the home. In full physical development activities, the forearm muscles which control the hand grip are given special exercises which assist in their development, and in order to determine the effectiveness of the forearm exercises, it is necessary or desirable to test the grip from time to time. Special scales for testing the hand grip are generally expensive, especially in view of the relatively infrequent use of them in the home exercising and physical development programs. It is therefore one of the principal objects of the present invention to provide a relatively inexpensive and convenient attachment for conventional or standard bathroom body weighing scales normally used in the home, which can readily be assembled on and removed from the scales so that the scales are not encumbered with the attachment except when the attachment is being used, and which can easily be used to test the grip without the need for moving the scales or placing them in special positions to perform the test.

Another object of the invention is to provide an attachment for body weighing scales for testing the hand grip which is simple in construction, design and operation, and which effectively utilizes the dial or gauge of the scales to give a reliable reading of the grip force.

Still another object is to provide a hand grip testing device of the aforesaid type which is compact and can be easily carried in luggage on trips to be used with any standard bathroom scales available, and which can effectively be used by anyone, regardless of physical strength or body development.

Further objects and advantages of the present invention will become apparent from the following description and accompanying drawing, wherein.

Figure 1:
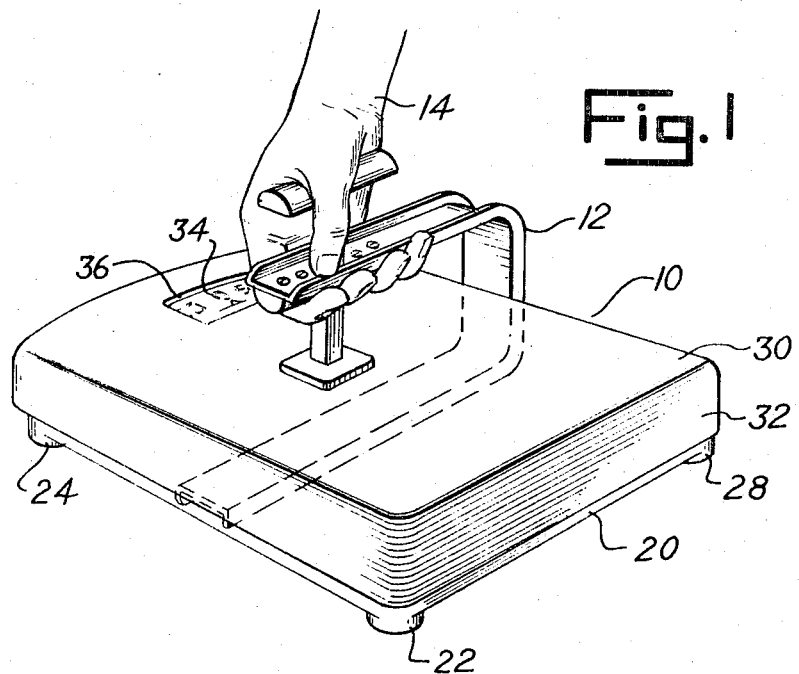
FIG. 1 is a perspective view of bathroom or body weighing scales and my hand grip testing attachment assembled thereon, with a hand showing the manner in which the attachment is used to test the hand grip.
Figure 2:
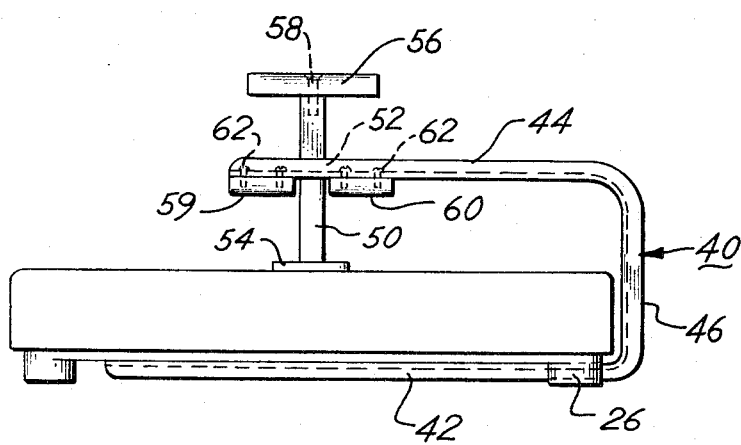
FIG. 2 is an end elevational view of the scales and side elevational view of the hand grip testing attachment shown in FIG. 1.
Figure 3:
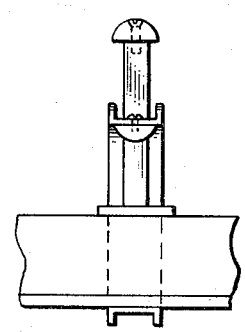
FIG. 3 is a fragmentary side elevational view of the scales and an end elevational view of the hand grip testing attachment mounted thereon.

Referring more specifically to the drawing, numeral 10 indicates generally body weighing scales, often referred to as bathroom scales, and numeral 12 indicates generally the hand grip testing attachment assembled on the scales in operating position. A hand 14 is included in FIG. 1 to illustrate the manner in which the attachment is used on the scales to obtain a reading of the strength of the hand grip.

For the purpose of the present description, the scales are considered conventional, consisting of a base 20 supported on four legs 22, 24, 26 and 28, and a platform 30 having a skirt 32 extending downwardly from the upper surface of the platform along the outer edge of the base, so that the base is essentially enclosed except at the lower edges and bottom. A dial or gauge 34 can be seen through a window 36 in the platform and can easily be read by the one using the scales as the dial rotates in response to the weight or pressure applied to the platform.

The hand grip testing device consists of a generally U-shaped frame 40 having a lower horizontal member 42 which extends under the bottom of the base and an upper horizontal member 44 extending over the platform in spaced relation thereto, the two members 42 and 44 being connected by a vertical member 46. The frame may be constructed in a number of different ways so long as it is essentially rigid, the one shown consisting of channel iron of sufficient strength and rigidity that it will not yield when the device is in operation. A cast metal or stamped frame may be constructed which performs satisfactorily, and reinforcing members at the corners may be desirable if a relatively light weight frame is used. The frame is preferably coated with a suitable paint or plastic material to give it protection and suitable appearance. The upper side of member 42 is preferably flat so that it will seat firmly on the underside of base 20, and vertical member 46 is sufficiently long that a substantial space is provided between the upper surface of the platform and the lower surface of member 44.

A vertically positioned plunger 50 extends downwardly through a hole 52 in arm 44 near the free end thereof, and is provided on the lower end with foot 54 for engaging the upper surface of platform 30, and on the upper end with a horizontal handle 56 secured to the stem by a screw 58 extending downwardly through the handle into the upper end of plunger 50. The plunger is adapted to reciprocate freely through hole 52. Handle 56 is preferably padded; for example, it may be constructed of wood with a leather cover thereon, or it may be coated with or constructed of plastic material. Further, the handle may be formed integrally with the plunger and may be sufficiently smooth that no padding or coating is required.

A pair of pads 59 and 60 is secured to the underside of member 44 on opposite sides of hole 52, i.e. on opposite sides of plunger 50, for cushioning the fingers as the hand grasps handle 56 and the two pads in the manner illustrated in FIG. 1, the two pads being secured to member 44 by a plurality of screws 62 extending downwardly through member 44 into the pads. The pads may be constructed of any suitable material to give adequate protection to the fingers, such as leather-covered wooden members, or plastic or rubber elements with or without inserts for receiving the screws 62. The plunger may be used without foot 54, and a different shaped handle, such as a ball, may be used in place of the straight handle. However, the one shown is the preferred design. Further, a coil spring around plunger 50 may be inserted between the upper surface of member 44 and the underside of handle 56, thereby automatically retracting the handle when the grip is released, thus permitting the device to be easily assembled on and removed from the scales. Only a light spring should be used, since it should not have any appreciable effect on the force which the hand is required to use to force the plunger and the platform of the scales downwardly to obtain the correct reading of pressure on the dial.

In the use and operation of my hand grip testing device using standard or conventional bathroom scales, member 42 of frame 40 is slipped beneath base 20 to the position illustrated in the drawing, thus placing member 44 above the platform. During the assembly operation, the plunger is withdrawn so that the frame will slip easily and firmly under the base and over the platform without interference from the plunger. After the device or attachment has been assembled on the scales in the manner illustrated, the hand grip is tested by placing the base of the hand preferably on the upper surface of handle 56 with the palm extending down on one side of the handle and the thumb on the other side. The fingers extend beneath member 44 and engage the lower surface of pads 59 and 60. When the muscles in the forearm are contracted and the fingers pressed upwardly firmly against pads 59 and 60, plunger 50 is forced downwardly, thus applying a pressure to platform 30. The amount of pressure in pounds is indicated on dial 34, which the one making the gripping test can easily read during the testing operation. When the one hand gripping test has been completed, the other hand can be tested in a similar manner.

While this device is primarily intended for a testing device, it can be satisfactorily used as an exercising device involving the squeezing or gripping action illustrated in the drawing. This can be repeated a number of times to exercise and strengthen the muscles in the forearm. The degree of pressure exerted in each of the exercising operations likewise can easily be read on dial 34, thus in effect controlling the amount of force which is exerted for development as well as for testing the hand grip. After the operation has been completed, the device can be readily removed from the scales by merely slipping member 42 from beneath base 20.

While only one embodiment of the present hand grip testing device has been described in detail herein, various changes and modifications may be made without departing from the scope of the invention.

I claim:

1. A detachable hand grip testing device for use with body weighing scales having a platform, a base, and a dial, comprising a generally U-shaped frame having a first member for seating beneath the base of the scales and a second member for extending above the platform in spaced relation thereto, a member supported by said second member and movable toward said first frame member for engaging the upper surface of said platform, and one part of a hand gripping means on said movable member and another part of a hand gripping means on said second member, for urging said movable member against said platform for registering the pressure on the scale dial.

2. A hand grip testing device as defined in claim 1 in which said member movably supported by said second member is a vertically positioned plunger.

3. A hand grip testing device as defined in claim 2 in which a handle is disposed on the upper end of said plunger.

4. A hand grip testing device as defined in claim 2 in which a foot is disposed on the lower end of said plunger for engaging the upper surface of said platform.

5. A hand grip testing device as defined in claim 4 in which pads are disposed on the underside of said second horizontal member on either side of said plunger.

* * * * *